United States Patent
Camurati et al.

(10) Patent No.: US 8,847,432 B2
(45) Date of Patent: Sep. 30, 2014

(54) METHOD AND DEVICE FOR TRANSPORTING, DISTRIBUTING AND MANAGING ELECTRICAL ENERGY BY REMOTE LONGITUDINAL COUPLING IN NEAR FIELD BETWEEN ELECTRIC DIPOLES

(75) Inventors: Patrick Camurati, Paris (FR); Henri Bondar, Kyoto-Fu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 445 days.

(21) Appl. No.: 12/672,141

(22) PCT Filed: Aug. 14, 2008

(86) PCT No.: PCT/FR2008/051501
§ 371 (c)(1),
(2), (4) Date: Apr. 23, 2010

(87) PCT Pub. No.: WO2009/024731
PCT Pub. Date: Feb. 26, 2009

(65) Prior Publication Data
US 2011/0234019 A1    Sep. 29, 2011

(30) Foreign Application Priority Data
Aug. 17, 2007   (FR) ...................................... 07 05944

(51) Int. Cl.
*H04B 5/00*    (2006.01)
*H02J 17/00*   (2006.01)
*H02J 4/00*    (2006.01)

(52) U.S. Cl.
CPC . *H02J 17/00* (2013.01); *H04B 5/00* (2013.01); *H02J 4/00* (2013.01)
USPC ......................................................... 307/104

(58) Field of Classification Search
CPC .......................................................... H04B 5/00
USPC .......................................................... 307/104
See application file for complete search history.

(56) References Cited

U.S. PATENT DOCUMENTS 3,778,677 A * 12/1973 Kriege ........................... 315/219
4,763,340 A *  8/1988 Yoneda et al. ................. 375/377
(Continued)

FOREIGN PATENT DOCUMENTS

EP    1 337 001 A1    8/2003
EP    1 689 062 A1    8/2006
(Continued)

OTHER PUBLICATIONS
International Search Report issued for PCT/FR2008/051501, mailed Mar. 10, 2009.

*Primary Examiner* — Adi Amrany
(74) *Attorney, Agent, or Firm* — Dickstein Shapiro LLP

(57) ABSTRACT

The apparatus according to the invention is composed of one or plural generator devices (2) connected to an energy source and of one or plural loads (3) (which may be mobile). Each load is powered by the intermediary of a limited spatial zone (4) where an electric field that is intense and rapidly varying is present, and this is achieved without wires or electrical contact or use of an earth connection. The intense field is created locally between certain sub-electrodes (5) located on the surface of the generator and an electrode (6) or several sub-electrodes on the load side and located opposite. The active sub-electrodes (5) on the generator side are selected by switches (7), for example magnetic switches activated by a permanent magnet (8) located at the load (3). On the load side, a passive electrode (9) is used which can be considered as mainly coupled to the surrounding dielectric medium. The invention targets, in particular, the tele-supply of energy to low and medium power fixed or mobile electric devices.

20 Claims, 2 Drawing Sheets

(56) References Cited

U.S. PATENT DOCUMENTS

Figure 1:
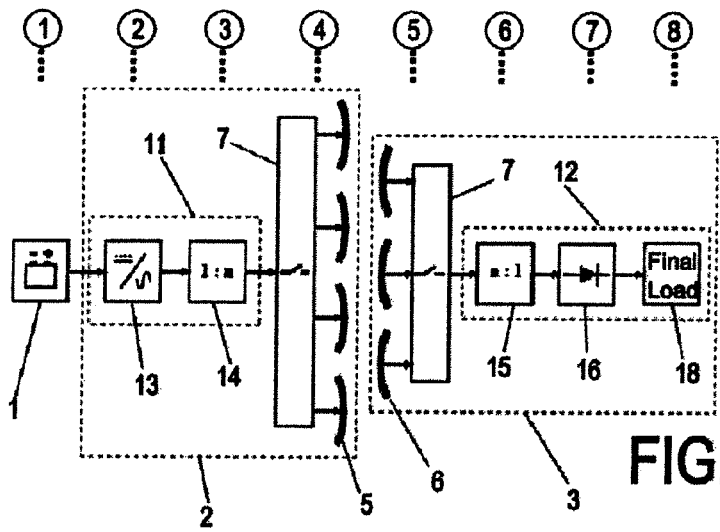

| Patent No. | | Date | Inventor | Class |
|---|---|---|---|---|
| 5,621,913 | A * | 4/1997 | Tuttle et al. | 455/41.2 |
| 5,696,428 | A * | 12/1997 | Pasch | 315/111.21 |
| 6,336,031 | B1 * | 1/2002 | Schyndel | 455/41.2 |
| 6,615,023 | B1 * | 9/2003 | Ehrensvard | 455/41.1 |
| 6,787,862 | B2 * | 9/2004 | Murray | 257/410 |
| 6,803,744 | B1 * | 10/2004 | Sabo | 320/108 |
| 6,856,788 | B2 * | 2/2005 | Chang et al. | 455/41.1 |
| 6,884,940 | B1 * | 4/2005 | Utsumi et al. | 174/542 |
| 7,142,811 | B2 * | 11/2006 | Terranova et al. | 455/41.1 |
| 7,152,040 | B1 * | 12/2006 | Hawthorne et al. | 705/16 |
| 7,233,137 | B2 * | 6/2007 | Nakamura et al. | 323/355 |
| 7,244,903 | B2 * | 7/2007 | Utsumi et al. | 218/120 |
| 7,397,174 | B2 * | 7/2008 | Shioya | 313/257 |
| 7,450,910 | B2 * | 11/2008 | Aoki | 455/69 |
| 7,465,900 | B2 * | 12/2008 | Adler | 219/69.16 |
| 7,511,452 | B2 * | 3/2009 | Bersenev | 320/106 |
| 7,521,890 | B2 * | 4/2009 | Lee et al. | 320/108 |
| 7,576,514 | B2 * | 8/2009 | Hui | 320/108 |
| 7,622,891 | B2 * | 11/2009 | Cheng et al. | 320/108 |
| 7,909,483 | B2 * | 3/2011 | Jacobs et al. | 362/276 |
| 8,049,370 | B2 * | 11/2011 | Azancot et al. | 307/104 |
| 8,090,550 | B2 * | 1/2012 | Azancot et al. | 702/62 |
| 8,159,183 | B2 * | 4/2012 | Choi et al. | 320/108 |
| 2002/0051435 | A1 * | 5/2002 | Giallorenzi et al. | 370/335 |
| 2003/0181229 | A1 * | 9/2003 | Forster et al. | 455/575.7 |
| 2005/0135150 | A1 * | 6/2005 | Brandenberger et al. | 365/173 |
| 2005/0236109 | A1 * | 10/2005 | Masuda et al. | 156/345.27 |
| 2006/0063488 | A1 | 3/2006 | Hraby et al. | |
| 2006/0171181 | A1 * | 8/2006 | Clavel | 363/131 |
| 2007/0090790 | A1 * | 4/2007 | Hui | 320/108 |
| 2007/0176561 | A1 * | 8/2007 | Adler | 315/46 |
| 2007/0182367 | A1 * | 8/2007 | Partovi | 320/108 |
| 2007/0298846 | A1 * | 12/2007 | Greene et al. | 455/572 |
| 2008/0054638 | A1 * | 3/2008 | Greene et al. | 290/1 R |
| 2008/0076351 | A1 * | 3/2008 | Washiro | 455/41.1 |
| 2008/0153416 | A1 * | 6/2008 | Washiro | 455/41.1 |
| 2009/0206675 | A1 | 8/2009 | Camurati et al. | |
| 2010/0033156 | A1 * | 2/2010 | Abe et al. | 323/305 |

FOREIGN PATENT DOCUMENTS

| | | |
|---|---|---|
| FR | 2 875 649 A1 | 3/2006 |
| FR | 2 875 939 A1 | 3/2006 |
| FR | 2 876 495 A1 | 4/2006 |
| WO | WO-2004-036784 A1 | 4/2004 |
| WO | 103 04 584 | 8/2004 |
| WO | WO-2007/107642 A1 | 9/2007 |

* cited by examiner

METHOD AND DEVICE FOR TRANSPORTING, DISTRIBUTING AND MANAGING ELECTRICAL ENERGY BY REMOTE LONGITUDINAL COUPLING IN NEAR FIELD BETWEEN ELECTRIC DIPOLES

TECHNICAL FIELD

Introduction

Electromagnetic waves are the best-known manifestation of electromagnetic fields. In the near-field context (that is, in the vicinity of material bodies), other phenomena of a different nature are present associated with fields that are purely electric or magnetic. These fundamental fields are not associated with wave radiation and can durably surround a body placed in a vacuum without occurrence of a noticeable loss of energy. These fields are often associated with so-called electrostatic or magneto-static regimes, but numerous applications exist where they are used in a dynamic manner to transmit energy via quasi-contact. In relation to magnetic fields, a number of rotating industrial machines can be mentioned, for transforming electrical energy into mechanical energy, and vice versa. In relation to electric fields, there are fewer applications but there are, notably, charge propulsion devices such as electrostatic painting processes or ionic propulsion units of satellites and, above all, the capacitors present in all the electronic cards of our daily environment. The inventors' main work is to extend, develop and promote the field of application of electrostatic devices to the more general dynamic field of electric dipoles which are oscillating sufficiently slowly so as not to radiate waves significantly but nevertheless are dynamically coupled between each other.

General Remarks

The very short distances and particularly low frequencies (of the order of a few centimeters and a few tens of Hz) of conventional applications have, for a long time, enabled the generalized use of the expression "quasi-static" to describe such regimes. Nowadays near fields are increasingly used over distances of the order of a meter and at frequencies in the range of MHz, so it becomes tricky to speak of quasi-static regimes. It would be possible to speak of non-radiating dynamic regimes but, in what follows, we propose to continue using the historical expressions based on the proper nouns "Electromagnetic Induction" and "Influence" (instead of the expression "Electrostatic Induction" which, in dynamic regimes, could lead to confusion).

Electromagnetic Induction systems and Influence systems are characterized by the fact that the majority of the energy brought into play remains stored locally in the vicinity of these devices, and does not propagate.

Although such devices are, necessarily, electromechanical or magneto-mechanical, at least on at the level of individual particles (that is, they bring into play the laws of electromagnetism associated with the laws of mechanics), this characteristic can be partly obscured at the macroscopic level, permitting the current omnipresent confusion between the near-field regime and that of EM waves. Thus, in the context of electromagnetic induction transformers, when the distance between two coils that are configured longitudinally becomes noticeable, numerous technicians believe that waves propagate between the two remote dipoles. It is relatively easy to demonstrate that besides the fact that the wavelength is often greater than the total size of the system, the Poynting vector, which represents the flow of electromagnetic energy, is zero on the axis of the two dipoles. This undeniable fact entails serious problems in interpretation, leading so far as to call into question the standard model for describing such interactions at close proximity.

Although the transmission of energy over short distances has been implemented for a long time by electromagnetic induction using coupled magnetic dipoles, it is only very recently that the present inventors have proposed devices using near-field longitudinal coupling between two electric dipoles. Such devices can be seen as the equivalent, for influence, of electromagnetic induction transformers.

As a practical matter, in order for such Electromagnetic Induction devices or Influence devices to be non-radiative it is, in general, necessary that their total size be small compared to the wavelengths of the signals that are employed. Larger systems can also be envisaged using zones of opposite phase in order to reduce radiation.

Thus, a device operating at 1 MHz, based on two coils, can be considered as an electromagnetic induction device so long as the distance between the coils is significantly less than 150 m!

It should be noted that there is great confusion these days, when very many devices are described as radiative devices when, instead, they are of inductive type. In particular, the very great majority of current RFID devices are Electromagnetic Induction devices.

The Framework of the Invention

Greater detail on the general context of the invention is described in the patents FR2875649, FR2875939, FR2876495 and PCT/FR2006/000614 submitted by the same inventors.

More particularly, the invention applies to the transfer of electrical energy, by total or partial influence, between two oscillating electric dipoles each comprising a pair of electrodes one of which is active and the other passive, the two active electrodes being positioned facing each other. The dimensions of the passive electrodes are larger than the dimensions of the active electrodes and/or the passive electrodes are positioned at a distance, so that the electric field in the vicinity of the active electrodes is much more intense than the electric field at the passive electrodes. On the generator side, the pair of electrodes is powered by a high voltage, high frequency generator connected between the two electrodes. On the load side, the load is connected between the two electrodes.

In order to prevent significant radiation of electromagnetic waves, although the frequency of the generator is relatively high, the dimensions of the active electrodes are small compared with the wavelengths in question. Typically, electrodes will be selected whose size is a tenth of the wavelength employed (so that the radiated power is $1/1000$ of the power of the near field). However, the use of larger electrodes (for example $\lambda/8$ or, even, $1/4$) is possible in certain applications where a greater degree of wave radiation can be tolerated (while recalling that an electrode of length $\lambda/2$ operates as an antenna). Furthermore, in applications which involve an increased need to avoid wave radiation, it can prove desirable to use electrodes smaller than $\lambda/10$.

In this context, the energy transfer occurs thanks to a change in the electric potential of the generator-side active electrode which induces, by total or partial influence, corresponding changes of potential at the active electrode on the load side. "Partial" influence arises when only some of the electric field lines generated by the active electrode on the generator side terminate at the active electrode on the load side.

Although it is possible to use the expression <<capacitive coupling>> to describe the interaction of the active electrodes, this coupling is much more general than that which is obtained in the case of a total influence capacitor. In the invention, according to the specific configuration of the active and passive electrodes (and the distances between these different electrodes) there will be multiple interactions. Such multiple interactions between charged conductors are described mathematically using matrices of capacitive coefficients, and usually cannot be reduced to a representation within the framework of conventional circuit theory. However, it is possible to give a representation thereof that is more expressive than abstract matrices by using new ideas such as the intrinsic capacitance of an isolated conductor and that of an open circuit. The main difficulty coming from the fact that, in such circuits, although electric charge is conserved, the physical current is no longer conserved. It is replaced, at the conductor/dielectric transition, by a displacement current called Maxwell displacement current, the precise nature and modelling of which is difficult to deal with. However, isolating the branches where conservation of physical current is achieved in practice, a hydrographical-type representation can be obtained, with branches where circuit theory applies normally, the latter being terminated on each side by sources/sinks which can be represented simply when they correspond to isolated conductors.

The reader is asked to excuse us for not being able to say more in these lines, because the corresponding theory is still under development. Our aim here is to prepare him for circuits which be would, otherwise, find strange or erroneous.

Consequently, according to the inventors, any earlier patent on devices that are integrally represented by normal circuits and conventional total influence capacitors cannot be considered as truly pertinent prior art in relation to the present invention which is in the field of partial influence and outside the framework of conventional circuit theory.

The Problems Addressed

The main advantage of near field devices (which is decisive in certain applications) is that they can transmit energy at a distance with a very good efficiency, the counterpart being their relatively limited range. In fact, we have said that these devices are surrounded by potential energy and, as it is not possible (in view of the large wavelengths employed) to produce a concentration of energy in one particular direction, the result is that the energy is distributed in all directions, decreasing very rapidly with distance. At each cycle, the fraction of the energy that it is possible to transmit to a remote load (which, in general, only covers a small part of the space where the energy is present), is generally very small.

In order for such devices to provide good efficiency, it is necessary to be able to efficiently recycle the energy that is stored but not used at each cycle. Translated into the language of the electronic engineer, this means that such systems necessitate a reactive power that is often much greater than the active power. In fact, in a conventional situation of quadripolar coupling, the field produced by the generator decreases very rapidly with distance, the energy stored locally (which is proportional to the square of the field) thus decreases extremely quickly with distance. At each cycle, in order to transmit a given amount of energy to a remote load if the load becomes distant or only represents a very small volume compared to that where the generator's field is present, it is necessary to store in the space at each cycle much more energy than that which is actually consumed by the load. If the load moves away by even a few times the size of the generator, the reactive power for the same transferred active power soon becomes unmanageable or produces a considerable dissipation in the elements which produce it. The relative range of such systems, measured in terms of L/D (where L is the distance between the dipoles and D the equivalent diameter of the generator) is, in practice, limited to a few units dependent on the efficiency that it is desired to achieve and on the "quality" of the circuits and the technologies that are used.

The second difficulty encountered by such devices is that the frequencies employed are high and, when it is intended to build large-sized devices, this leads to EM radiation emitted by the free surfaces of the active electrodes.

The Contrasting Advantages of the Invention

The present invention proposes, in association with the wireless transmission of energy in a longitudinal-coupling configuration between oscillating electric dipoles, a simple means of limiting the region of intense field to the immediate vicinity of the loads, whereby to reduce the dissipation caused by the strong reactive power and by the parasitic wave radiation.

In order to overcome the problem of large reactive power levels (which is particularly critical for electromagnetic induction systems for which the increase in the reactive power rapidly translates into large currents and large Joule losses), in U.S. Pat. No. 6,803,744 B1 it is proposed to segment the active surface (that is, the one where the intense field is produced) into regions covered by multiple small coils activated, as desired, according to the position or needs of the load.

The present invention describes a method and a device in the context of partial (or total) influence which use an active electrode which is segmented into plural sub-electrodes, at least on the generator side, and the selective switching of the sub-electrodes, so as to activate those which are in effective interaction with an electrode (or a sub-electrode) on the load side.

There are several significant differences between an electromagnetic induction system having a segmented active surface and a partial influence system having segmented active electrode(s) and selective switching. The Partial influence system having segmented active electrode(s) offers numerous advantages:

The production of intense electric fields is not necessarily associated with significant intensities and requires a much smaller amount of costly conductive metals.

The active surface can be covered at low cost using very little conductive material.

It is possible to better control the shape of the region where the field is intense and, optionally, to displace it simply using weakly-conductive wires or materials.

The field generator can be remote from the active electrode(s) whereas the transport and switching of a magnetic field at a distance is much more problematic.

The switching operations can occur on a single pole on its own (there is no magnetic monopole), which makes it possible to use a single wire to connect the generator to the whole set of sub-electrodes.

The method according to the invention is similar to the usual method for transporting electrical energy by high-voltage lines; however it is differentiated by the use of much higher frequencies, the absence of wires in the final stage of distribution, and the application of the intense field solely to regions located in the immediate vicinity of loads.

In contrast to the patent DE 103 04 584 A1—where loads (which can be plural) are located in the very interior of the generator structure—the invention is differentiated by the fact the that generators and loads are external to and remote from each other, by the use of passive electrodes, and by a limitation of the region where the electric field is present.

In contrast to the patent CA 2 526 245 A1—based on a double conventional capacitive coupling (involving, at each moment, the use of at least two pairs of electrodes)—by virtue of the longitudinal coupling between two electric dipoles the method according to the invention enables the use of a single pair of electrodes, which enormously simplifies the control of the switching operations.

In contrast to our own patents, the invention is differentiated by the use of means which permit the limitation of, and control of, the extension of the region where the electric field is intense, whereby to obtain improved efficiency.

DESCRIPTION OF THE INVENTION

Preliminary Remarks

The invention proposes a method and a device for transporting distributing and managing electrical energy—at a distance—by partial influence according to a quasi-longitudinal mode which can still be called: "near-field longitudinal electric coupling between two or plural dipoles".

Two types of dipolar (or, optionally, multi-polar) devices are considered, called respectively generators and loads. The given dipoles (or multi-poles) are coupled in near-field via an intense electric field at relatively high frequency.

By "high frequencies" it should be understood frequencies that are much higher than those normally used for transporting electrical energy. The devices are mainly characterized by the fact that they are coupled preferentially in a longitudinal manner and they only radiate very little electromagnetic energy. This is the case, notably, when the wavelengths in the surrounding medium are clearly greater than the size of the generator device. The intense electric fields are limited by the breakdown field strength in the considered medium and lead to very high voltages when the distance between the electrodes becomes fairly large.

The obtained voltages and frequencies are, thus, a function of the power to be transmitted, of the size of the devices and of the distances separating them.

Below we will use the concise expression HVHF (High Voltage High Frequency) to describe the generators and loads directly associated with such devices. Conversions to other types of voltages or frequencies, step-up or step-down, are still possible using conventional electronic techniques.

Each device according to the invention is constituted by at least one HVHF generator or a load of the same type, connected at each of their ends to at least one electrode of varying size and shape. The assemblies made up, on the one hand, of the generator and electrodes connected thereto and, on the other hand, of the load and electrodes connected thereto, each constitute oscillating electric dipoles. The configuration which is favoured in the context of the invention corresponds to the cases where the dipoles are arranged longitudinally, that is, on the same axis. However, in certain cases of close coupling, the dipoles have very large angles between them, possibly greater than a right angle.

One of the passive electrodes on the load side or generator side may, optionally, be replaced by a connection to earth.

In the context of the invention, the coupling that is implemented between a generator and a particular load is characterized by the fact that only two electrodes are primarily involved in the link, one electrode on each side. These electrodes (called "active electrodes") are preferentially placed directly face to face (opposite each other), that is they preferentially present surfaces that are locally parallel to each other and are positioned at relatively short distance from each other. The other electrodes (called "passive electrodes"), and a fortiori the earth, are in an environment where the field is weaker. This asymmetry is obtained by adjusting the size of the different electrodes or by adjusting their positioning, that is, their respective distances. In numerous applications it is the shielded parts of the devices or conductors of large size and, more generally, the earth or primary ground on the generator side and the secondary ground on the load side which play the role of passive electrodes.

In a configuration involving tight coupling, that is, when the two dipoles under consideration are quite close to each other, it may be considered that the coupling between the two active electrodes is significantly dominant and, thus, that they operate in a total influence regime, the two other distant and passive electrodes may then be considered as only coupled to the surrounding dielectric medium. In such cases the dipoles can have any relative orientation provided that the passive electrodes remain sufficiently distant from each other. The extreme case of two symmetrical dipoles fairly distant from each other is another possible configuration of the invention. In such cases the dipoles will be positioned on the same axis or on axes forming small angles. Between these two examples one can implement numerous configurations which cannot be reduced to simple assemblies of normal total influence capacitors. These configurations are obtained while keeping a global arrangement which is preferentially longitudinal and varying, on the one hand, the sizes and shapes of the electrodes and, on the other hand, the respective distances between them.

The present invention provides a method of transporting electrical energy at a distance according to claim 1, and a device for transporting electrical energy at a distance according to claim 5.

In the context of the invention the electrodes are segmented and selectively switched but, in general, the main principles discussed above apply, notably: for a given generator-load link, at a given moment, the coupling is basically made using two active electrodes for a preferentially longitudinal configuration.

The present invention envisages, amongst others, applications in situations which are strongly asymmetric where a large-scale generator (physical dimensions) powers plural small loads, which may be mobile and situated relative to the generator at relatively large distances compared to their own sizes.

The method according to the invention consists in applying very high voltages, at high frequency, selectively via a switching system, to certain localized regions of the space to be covered. Energy is transmitted at a distance via an intense electric field according to a longitudinal, non-radiative mode. The ideal situation according to the method of the invention is to limit the regions where electrical energy is present to only the regions occupied by loads consuming energy.

In this regard, the invention relates to a wireless mode of energy distribution.

So as to produce the HVHF voltages that are to be applied, typically the method comprises steps of successively: transforming low-voltage D.C. or low frequency electrical energy to electrical energy at low voltage and high frequency, and then greatly increasing the voltage.

DRAWINGS

Figure 2:
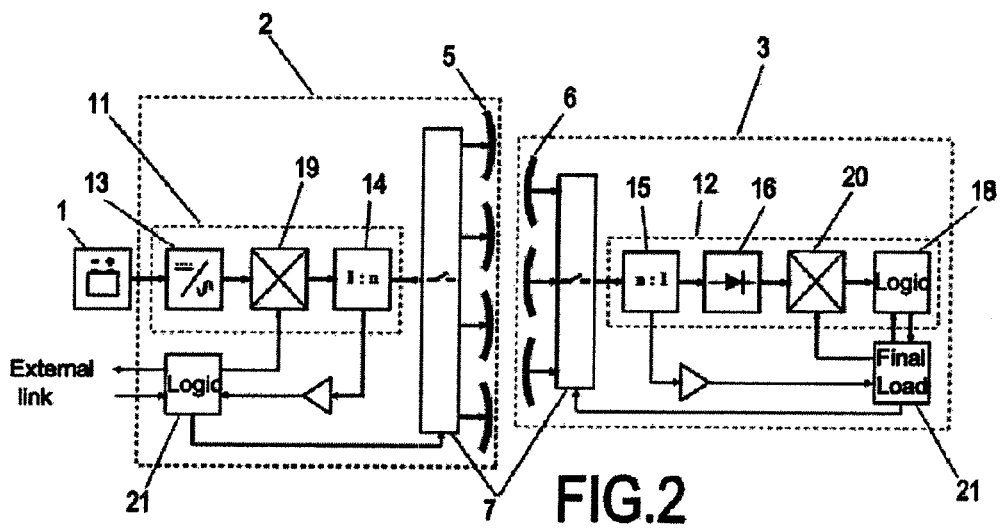
Figure 3:
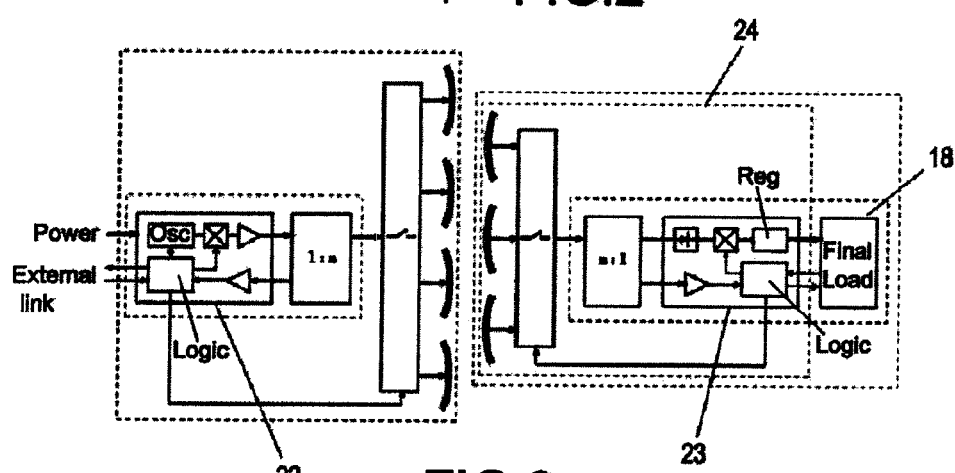
Figure 4:
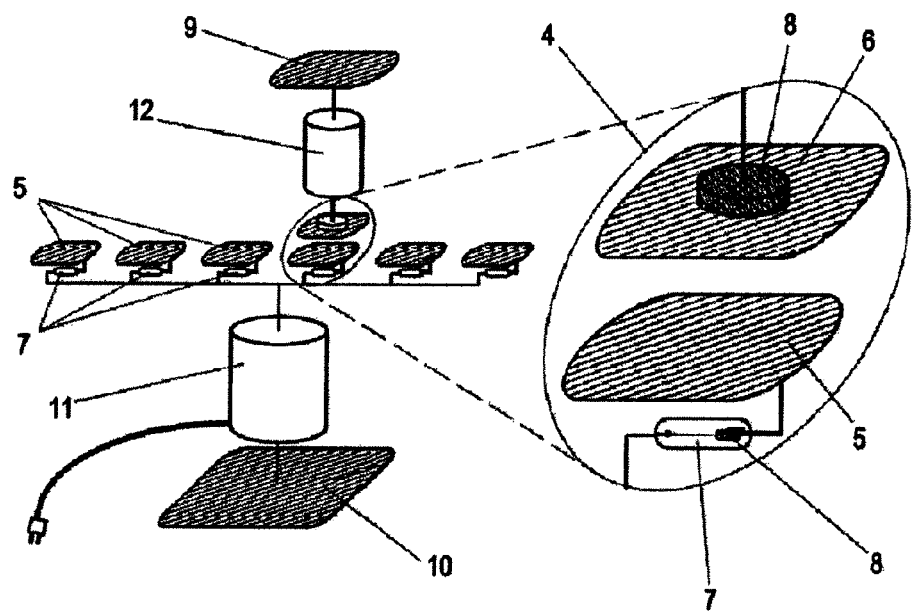
Figure 5:
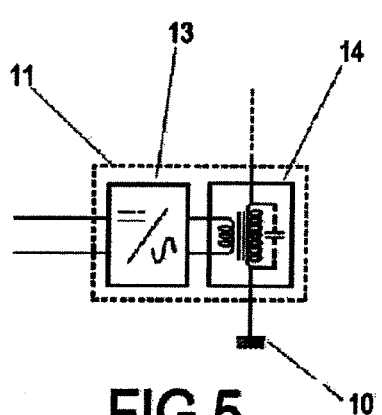
Figure 6:
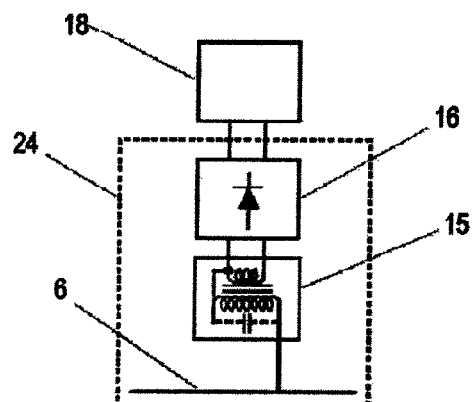
Figure 7:
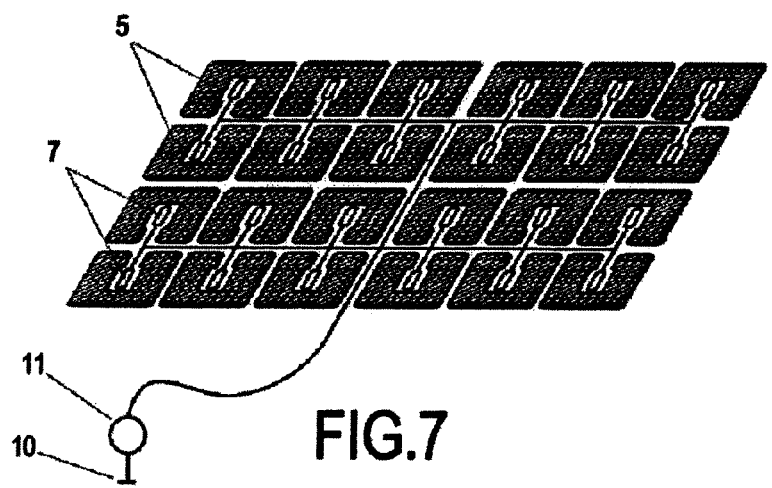

The features and advantages of the invention will be better understood from reading the following description of certain preferred embodiments thereof, given purely for illustrative purposes, in association with the annexed drawings, in which:

FIG. 1 schematically illustrates an embodiment of the method according to the invention, FIG. 2 illustrates a variant of the embodiment of FIG. 1, FIG. 3 illustrates a variant of the embodiment of FIG. 2, FIG. 4 schematically illustrates an embodiment of the system according to the invention, FIG. 5 schematically illustrates the structure of an HVHF generator used in the generator device of the system of FIG. 4, FIG. 6 schematically illustrates the structure of an HVHF generator used in the generator device of the system of FIG. 4, and FIG. 7 illustrates a particular form that the segmented electrode may take.

METHOD

A preferred embodiment of the method according to the invention will now be described. According to this embodiment, the method comprises the following steps:

Step 1: Electrical energy comes from an external source in the form of a low-voltage direct or alternating current.

Step 2: This current, possibly after having been rectified, is transformed into a high-frequency alternating current using appropriate techniques.

Step 3: The voltage of this alternating current is next greatly increased using means such as voltage-raising transformer devices.

Step 4: One of the terminals of the high-voltage generator is connected to earth or to a sizeable electrical ground, the high voltage of the other terminal is applied selectively via detection and switching means to one or plural sets of sub-electrodes (which correspond to a segmented active electrode).

Step 5: When the device is operational, there is located in direct opposition to these sets of sub-electrodes at least one electrode possibly forming part of a set associated with other switching means on the load side, connected to a terminal of a device operating at high voltage and high frequency. The other terminal of the load is connected to a sizeable metallic ground.

Step 6: Within this device the voltage is lowered using appropriate means such as transformers.

Steps 7: The low voltage is next rectified and regulated by specific electronic means.

Step 8: The low-voltage electrical energy is applied to the final load.

The switching means are associated with detection and control means located on the generator side or load side or partly on each side.

The sub-electrodes are switched by these means in such a manner that the number and the position of the sub-electrodes that are active at a given moment are optimized dependent on the reciprocal positions of the generators and loads and on the requirements of the latter. For example if, during a transfer, the distance between a load and the generator device increases, the number of neighbouring sub-electrodes that are activated can be increased so as to increase the effective size of the active electrode on the generator side.

The sub-electrodes on the generator side are, advantageously, provided with (optionally electronic) circuits, enabling them to adopt protection or standby modes when the transmission of energy between them and the loads that may be present is no longer necessary or cannot be accomplished correctly.

Numerous variants are possible without departing from the scope of the method, for example:

Steps 2 and 3—relating to the production of electric current at high frequency and the stepping-up to high voltage—may be inverted, that is, the voltage may be raised before increased the frequency of the signal.

Optionally, the switching operation is implemented before increasing the voltage in the case where transformers are used at each active sub-electrode, the switching operation may also optionally be implemented before the production of the high frequency current in the case where electronic modules are associated with each of the active sub-electrodes. It is also possible to combine the preceding solutions for the switching operation in any way.

In the same way, the possible switching operations on the load side (in the case of segmented electrodes on the load side) are optionally implemented after the lowering of the voltage or after the rectification, or any combination of these possibilities.

In the case of a load of variable orientation provided with a segmented active electrode, the sub-electrodes which are not active are optionally connected to ground so as to achieve a passive electrode of increased size.

The control of the detection and switching means which drive the activation of the sub-electrodes is either performed locally (for example through the use of magnetic switches on the generator side and magnets located on the opposing device), or remotely using specialized circuits such as microcontrollers associated with position detectors enabling the loads that are present and/or active to be localized.

Communication protocols are optionally used for the exchanges of energy and/or data between the loads, the generator(s) and, optionally, the outside world.

They are implemented either by exploiting the electrical link that is used for the transfer of energy—in a mono- or bi-directional manner—or by any other existing communication technique.

FIG. 1 schematically illustrates one possible implementation of the method, the steps are indicated using circled numbers located at the top of the drawing. An external electrical-energy source 1 providing direct current at low voltage supplies a generator 11 of high voltage at high frequency constituted by a dc-to-ac converter 13 (which outputs a signal of the desired high frequency) and a voltage step-up transformer 14. In this variant there are 2 sets of switched sub-electrodes, one 5 on the generator side and the other 6 on the load side, with associated switching means 7. On the load side, the electrical energy that is received via the sub-electrodes 6 is applied to a device 12 constituted by a voltage step-down transformer 15, a rectifier 16 and the final load 18. It should be noted that the components of the device 12 change according to the intended application (notably as a function of the electrical characteristics of the final load 18).

For simplicity, the detection and control means of the switching means 7 are not shown in FIG. 1. According to the example of FIG. 1, the switching operations occur on the HVHF side, that is: on the generator side after the voltage step-up transformer 14 and, on the load side, before the voltage step-down transformer 15.

FIG. 2 illustrates a similar possible implementation where, in addition, there are shown supplementary modulation and control means, the modulation means serving to superpose a desired modulation signal on the transferred energy. The modulation that is used is bidirectional amplitude modulation; it is implemented on the generator 2 side by a modulator 19 which achieves a modulation of the amplitude of the signal applied to the transformer 14 and, on the load side, by a load modulator 20. The detection of the modulation signals on the devices is achieved at the transformers, these signals, optionally, being amplified and shaped before being processed by a logic unit 21 which also controls the exchange of data with the outside.

FIG. 3 schematically illustrates a situation in which the main functions described in relation to FIG. 2 are grouped into specialized integrated circuits 22 on the generator side and 23 on the load side. There is also shown a possibility of grouping functions that are necessary to convert existing products that are already on the market (into devices capable of participating in an energy and/or data transfer according to the invention) in the form of an adapter device 24 which comprises all the elements located on the load side with the exception of the final low voltage load 18.

It is to be noted that, in the three preceding representations, the electric circuits of the primary on the generator side and of the secondary on the load side implicitly perform the role of the passive electrodes.

Device Implementing the Method

Certain preferred embodiments of device according to the invention will now be described.

General Structure

The full apparatus according to the invention is composed of one or plural generator devices 2 (usually fixed) connected to a source of electrical energy 1, and of a set of loads 3 that may be mobile. Each load is powered—without using wires, or electrical contact, or a connection to earth—via a restricted spatial region (see FIG. 4) where an electrical field 4 that is intense and rapidly variable is present. The intense field is created locally between certain sub-electrodes 5 situated on the surface of the generator and one electrode or plural sub-electrodes situated opposite on the load 6 side. The generator sub-electrodes are selectively activated by detection and control means associated with switches 7. The switches are, for example, magnetic and activated by a permanent magnet located at the load 8.

The device is characterized notably by the use of passive electrodes 9, 10 on the load side and generator side, respectively. These electrodes are preferentially of larger size than the active electrodes and/or sufficiently distant from the latter such that they are mainly coupled to the surrounding dielectric medium. In practice, this situation is achieved when their own capacitances are only a little different from their self-capacitances when they are alone in a vacuum. These capacitances are represented by the diagonal elements $C_{ii}$ corresponding to their order numbers in the coupling matrix defined by:

$$Q_i = C_{ij} \cdot V_j,$$

Generators

The generator devices according to the invention are composed of one or plural HVHF generators 11 connected, on the one hand, to a large passive electrode or to earth 10 and, on the other hand, to one or plural sets of smaller active sub-electrodes 5, via a network of wires and a set of switches 7.

Loads

The devices of load type according to the invention are composed of one or plural HVHF loads 12 connected, on the one hand, to an active electrode 6 and, on the other hand, to a passive electrode 9, preferably of larger size. The loads optionally contain sets of active sub-electrodes. For example, according to a particular application of the invention, a set of sub-electrodes constituting the active electrode on the load side is disposed around a wheel (for example a bicycle wheel).

HVHF Generators

The HVHF generators 11 according to the invention are obtained either from low voltages using step-up transformers 14 of induction or piezoelectric type associated with an electronic circuit 13 producing the high frequencies at low voltage or any other technology susceptible of simultaneously producing intense electric fields and high frequencies. Advantageously, they include resonant circuits and/or energy-recovering devices so that the unused part of the energy is not totally dissipated at each cycle. Optionally, the generators use resonant induction transformers so as to achieve via one component the boost in voltage and the energy recycling device. Advantageously, the generator's ground or the earth play the part of passive electrodes.

HVHF Loads

The load structure is usually dipolar, but when more than two electrodes are used simultaneously they also form more complex multi-polar structures.

According to certain applications of the invention, the loads are composed of high impedance media of resistive type or, alternatively, of dielectric media having high loss angles which directly use the energy of the field, for example, to produce heat or light. In such cases it can be considered that the electrodes are virtual and are constituted by the external surfaces of such components, via which the electric field lines enter and exit.

Optionally, the loads are constituted of an adapter 24 connected to one or plural existing devices so as to make them compatible with the technology proposed according to the invention. The adapter device is constituted of at least one active electrode 6 and, optionally, passive electrodes 9, it can also comprise a voltage step-down transformer 15, optionally resonant, and an electronic rectifying and regulating module 16 according to the electrical characteristics of the existing device. In certain cases, low-impedance circuits and/or metallic shielding parts of the final load are advantageously used to serve as the passive electrode.

Distribution

The distribution of the energy is preferentially made between the high voltage terminal of the HVHF generator 11 and the set(s) of active sub-electrodes 5 on the generator side via the network of switches 7. This embodiment enables the use of a single wire to carry the HVHF electric energy to the whole group of sub-electrodes constituting the segmented active electrode. Moreover, this wire can be very thin (see below).

According to other embodiments of the device according to the invention, the distribution of the energy is achieved via a network of switches positioned between the energy source 1 and the dc/ac-conversion electronic circuits 13 associated with step-up transformers 14 located at each active electrode of the generator 5.

Another possibility is to use a switching-mode circuit to convert the low voltage direct current to high frequency by a single, suitably-adapted power circuit 13 and to then distribute this high frequency, via a network of switches, to a set of step-up transformers 14 associated with each active electrode of the generator 5.

The Wires

The connection wires carrying the HVHF voltages do not need to be good conductors of electricity; optionally they are very thin or replaced by small quantities of conductive materials deposited or included in other (optionally flexible) dielectric materials, such as sheets, bands, ribbons.

The Electrodes

The active sub-electrodes 5 may, optionally, exploit the same possibilities as the wires, that is, they can be implemented using a small amount of conductive material, optionally included or deposited on flexible dielectric surfaces.

The sub-electrodes and electrodes can have any shape; however, for the active electrodes it is appropriate to avoid sharp edges that would be liable to generate losses by ionisation and to cause degradation of surrounding dielectric materials by the corona effect.

In certain applications it can be useful to be able to create the desired intense electric field at any position whatsoever on the surface of the generator. In such a case, the surface can be mapped, for example, by identical sub-electrodes that are triangular, rectangular, hexagonal or take any other shape that is capable of covering the totality of the surface in a mosaic fashion. Sub-electrodes having any appropriate shapes and surface area whatsoever can be used in particular situations which require, for example, improved control in certain zones.

The choice of the respective size and shape of the sub-electrodes and electrodes is completely unrestricted; however, on the generator side it is preferable to employ the smallest possible sub-electrodes so as to be able to create the desired intense field in the immediate locality of the active electrode (or active sub-electrodes) on the load side, while limiting the spread of the intense field into the unoccupied regions. If the dimensions of the sub-electrodes on the generator side are comparable to those of the active electrodes on the load side, or a little larger, an adequate supply to the load is achieved while activating a single sub-electrode at a time on the generator side which makes the switching on the generator side simpler.

If the dimensions of the sub-electrodes on the generator side are much smaller than those of the active electrodes on the load side, it is generally necessary to activate plural sub-electrodes at a time on the generator side in order to ensure an adequate powering of the load. Furthermore, in certain cases where the sub-electrodes on the generator side are the same size as or a little smaller than the electrodes (or sub-electrodes) on the load side, two or more sub-electrodes at a time can be activated on the generator side if the electrode on the load side is positioned facing the boundary between these sub-electrodes.

If the dimensions of the sub-electrodes on the generator side are much larger than those of the active electrodes on the load side, the intense field region that is created is larger than necessary, which involves a waste of energy. However, this waste may be tolerated in certain applications where there is a strict requirement to ensure adequate powering of the load.

When there are segmented electrodes on both sides, the shapes and the sizes of the sub-electrodes are adapted to each individual case.

The Switches

The switches 7 may be of very different technologies varying dependent on the selected distribution mode (high voltage or low voltage), the power levels employed and the triggering means that are used. Optionally they can be integrated with control electronics. They may be, alternatively, electromechanical, magneto-mechanical, electromagnetic, optical, acoustic or may include any other technology of triggering at a distance. Optionally, they exploit the difference in potential at their terminals so as to power themselves without needing additional cabling. By using such a self-powering of the switches 7, a configuration can be obtained in which a single wire runs from the HVHF generator to the whole set of sub-electrodes 5.

According to a preferred embodiment of the invention, like the wires and the electrodes, it is advantageous for the switches to use a small amount of conductive materials when they are placed on the HV.

The switches 7 are preferentially positioned in the immediate vicinity of each active electrode 5 and are driven either by a direct mechanical action (solid contact, pressure, . . . ), or at a short distance directly by an action due to proximity to a load, or indirectly by electronic means. In the case of using electronic means, the latter are integrated either into the switches themselves or at each electrode or are located at the generator or distributed partly in the generators and partly in the loads.

The Control, Detection and Communication Means

In the case where the means of detection and control are not integrated into the switches themselves, they are distributed in the form of electronic modules present in the generator and/or the loads. Optionally, they take the form of specialized integrated circuits 22, 23. The electronic means are optionally associated with software means in the form of communication protocols. Optionally, the communication means use the same support as the energy transmission, and implement appropriate modulating and demodulating means 19,20.

Some Example Embodiments

FIG. 4 illustrates a particularly simple embodiment of the invention; a HVHF generator 11 is connected, on the one hand, to a large passive electrode 10 and, on the other hand, to a set of small electrodes 5—the sub-electrodes—via a network of Reed-type magnetic mechanical switches 7. The magnetic switches are activated by the presence, within a short distance, of a load 3 equipped with a permanent magnet or an electro-magnet 8, arranged in such a manner that the magnet 8 located in the switch 7 is attracted or repelled so as to open or close the contact according to the presence or requirements of the load.

According to a variant of the embodiment of FIG. 4, the switches 7 comprise a detector (not shown) which serves to detect a modulation applied on the load side (this modulation serving to produce a variation in the electric charge present on the active electrode on the load side). The contact of the switch 7 is maintained closed only when this modulation is detected by the sensor. This feature makes it possible to avoid an inopportune activation of the sub-electrode when a magnetic field is present which does not come from the expected load 3. Even in the case where the switches 7 are controlled by other stimuli (solid contact, pressure, etc.) this same type of sensor may be employed and this same modulation at the load side so as to prevent an undesired activation of the sub-electrode.

FIG. 5 shows a possible implementation of the HVHF generator 11. In this implementation, the low voltage electric current is transformed, in a first step, into an alternating (optionally sinusoidal) current before being applied to a resonant step-up transformer of Tesla type 14. The low voltage terminal of the secondary winding of this transformer is connected to earth, the high voltage terminal being connected to the distribution network.

FIG. 6 illustrates an implementation of the load in the form of an adapter connected to an existing load. The adapter 24 is composed of an active electrode 6 connected to the high voltage terminal of the primary winding of a resonant-type step-down transformer, the low voltage terminal of this winding being connected to the secondary of the circuit. The secondary of the transformer is connected to a rectifying circuit optionally containing regulating elements 16. The output voltage is then applied to the final load. In this embodiment the low impedance circuits of the secondary and of the load play the part of the passive electrode.

FIG. 7 illustrates an embodiment in which a very thin surface of a dielectric material (which may be flexible) is used as a support for a set of sub-electrodes. The sub-electrodes are implemented by deposition or by electro-deposition and/or etching. The electronic-type switches are constituted, for example, by transistors mounted in series, optionally associated with a circuit detecting the presence of a load, for example the presence of a modulation caused by the presence, within a short distance, of a load equipped with an appropriate modulation circuit. Transistors, and control and detection circuits, are implemented using a similar technique of deposition on a dielectric substrate.

When in standby position (that is, open) the circuit electronically controlling the switch is optionally powered by the potential difference existing between the generator and the floating electrode, without needing supplementary wiring.

In a variant of the invention (not shown), when extended spatial regions must be covered—and in order to limit radiation of waves—in-phase and anti-phase sectors are provided using plural out-of-phase generators or by alternately switching the active electrodes at one of the two terminals of the same generator.

Some Examples of Applications

The present invention may be employed in very diverse applications in which the dimensions of the electrodes, and the frequencies used, vary enormously (dependent on the application). Here are some examples for illustration, not limitation:
- a system for powering domestic appliances from a work surface provided with a generator device according to the invention (the domestic appliances being provided with load devices according to the invention),
- a system for powering one/plural loads carried by a vehicle (or for powering the vehicle itself) from a generator device according to the invention installed along the roadway (for example, underground, in milestones, or in signs at the side of the road, etc.);
- a system transferring electrical energy and data between a master generator device and plural child load devices (for example a generator device installed in a bus station, and load devices installed in buses);
- powering a mobile telephone or other mobile device (MP3 player, portable computer, etc.) from a generator device installed in the wall of a house, etc.

The invention aims, amongst other things, at the tele-supply of energy to low or medium power fixed or mobile electrical devices.

In the case of energy transfers over large distances, the voltage level or the intensity of the electric field necessary in order to ensure the transfer risk exceeding the limits specified in current standards (which do not allow the use of voltages exceeding some tens of kilovolts). However, as the standards develop, the application of the invention may extend to even greater scales.

The invention claimed is:

1. A method of transporting electrical energy at a distance, the method comprising:
   providing a generator device comprising a first pair of electrodes, a first electrode of the first pair of electrodes being an active electrode and a second electrode of the first pair of electrodes being a single passive electrode, the first pair of electrodes being connected to a pair of terminals of a generator of electric energy at high frequency and high voltage, wherein the active electrode is segmented into a plurality of sub-electrodes that are connected to a first terminal of the pair of terminals via respective switches, and the single passive electrode is directly connected to a second terminal of the pair of terminals, without an intervening switch, and wherein the switches are configured to selectively control which sub-electrodes are connected to said first terminal of the generator;
   providing at least one load device, the load device comprising a second pair of electrodes one being an active electrode and the other being a passive electrode that is not grounded, the second pair of electrodes being connected to a load;
   positioning the active electrode of the at least one load device in the vicinity of sub-set of the plurality of sub-electrodes of the generator device;
   automatically detecting the sub-set of sub electrode in whose vicinity the active electrode of said at least one load device is positioned; and
   transporting electrical energy to said at least one load device by activating the respective switches to connect, to said one terminal of the generator, said sub-set of sub electrode detected in the detecting step, while the other sub-electrodes are not connected to the generator, creating a region of intense electric field localized in the vicinity of said at least one sub-electrode, the region being located in the vicinity of said at least one load device, capacitvely coupling said sub-set of sub electroted detected in the detecting step to the active electrode of said at lease one load device, whereby said intense electric field region induces an electric charge in the active electrode of said at least one load device thereby transferring electrical energy to the load device.

2. The method according to claim 1, wherein information is transmitted mono- or bi-directionally using modulation and demodulation units integrated in the generator device and the load device.

3. The method according to claim 2, wherein electrical energy is transmitted to the at least one load device according to a communication protocol enabling each load device to itself trigger the energy transfer, the communication protocol being implemented using detection means, control means and switching means situated at each active sub-electrode of the generator device and/or at the load device.

4. The method according to claim 3, wherein said communication protocol comprises protection-type or standby-type modes when the transport of energy between said generator device and at least one of the load devices is no longer necessary or can no longer be implemented correctly.

5. A system for transporting electrical energy at a distance by near-field longitudinal electric coupling between at least two oscillating electric dipoles, the system comprising:
   at least one generator device, said generator device being provided with a first pair of electrodes, one being an active electrode and the other being a single passive electrode, the first pair of electrodes being connected to a pair of terminals of a generator of electric energy at high frequency and high voltage, wherein one terminal of the pair of terminals is connected to the active electrode via a plurality of switches, and the other terminal of the pair of terminals is directly connected, without an intervening switch, to the single passive electrode, the active electrode being segmented into a plurality of sub-electrodes, wherein the generator is configured to supply the high frequency high voltage to the plurality of sub-electrodes via a single conductor and the plurality of switches, each of the plurality of switches, being configured to selectively connect the sub-electrodes to the single conductor;
   at least one load device comprising a second pair of electrodes one being an active electrode and the other being a passive electrode that is not grounded, the second pair of electrodes being connected to a load; and
   a control for selectively activating a subset of the plurality of switches to connect at least one of the sub-electrodes to the generator, while other sub-electrodes are not connected to the generator, said at least one sub-electrode constituting a first end of a first electric dipole while a second end of the first electric dipole is constituted by the passive electrode of the generator device;

wherein said control being further adapted to activate at least one sub-electrode facing an active electrode of one of the at least one load devices, said active electrode of the at least one load device constituting a first end of a second electric dipole while a second end of the second electric dipole is constituted by the passive electrode of the load device.

6. The system according to claim 5, wherein the single passive electrode of at least one of the generator device and the load device is replaced by a connection to the primary ground or to the earth.

7. The system according to claim 6, wherein the generator comprises an electronic device and at least one voltage step-up transformer.

8. The system according to claim 7, wherein the single passive electrode of the load device is metallic shielding of a low-voltage load or low-impedance circuits of the low-voltage load.

9. The system according to claim 7, wherein the voltage step-up transformer is an induction transformer of resonant type, or a piezoelectric transformer.

10. The system according to claim 5, wherein the generator comprises an electronic device and at least one voltage step-up transformer.

11. The system according to claim 10, wherein the single passive electrode of the load device is metallic shielding of a low-voltage load or low-impedance circuits of the low-voltage load.

12. The system according to claim 10, wherein the voltage step-up transformer is an induction transformer of resonant type, or a piezoelectric transformer.

13. The system according to claim 5, wherein the load devices operate directly at high voltage or are constituted by a voltage step-down device associated with a conventional low-voltage load.

14. The system according to claim 5, wherein the connections between the generators and the electrodes associated therewith and the loads comprised in the load devices and their associated electrodes are implemented using conductor wires, and the conductor wires, the electrodes and the switching means, are constituted by conductive materials deposited or included in dielectric materials.

15. The system according to claim 5, wherein a size, number, shape and position of the sub-electrodes of the generator is sufficient so as to ensure at each moment coverage of the load-side active electrode.

16. The system according to claim 5, wherein each of the plurality of switches and a respective detector at a distance are positioned close to the sub-electrodes, each of the plurality of switches being positioned upstream of the generators when the generator is situated at each sub-electrode.

17. The system according to claim 16, wherein electronic means integrated into a switch forming part of each of the plurality of switches, or in close vicinity thereof, is powered by a potential difference existing between terminals of said switch forming part.

18. The system according to claim 16, wherein electronic control means controlling each of the plurality of switches are partly or totally grouped within specialized integrated circuits and are associated with an electronic communicator that operates using a common link as that used for the transport of energy.

19. The system according to claim 5, further comprising supplementary circuits integrated into said control means, enabling the system to adopt protection or standby modes when the transport of energy between said at least one generator device and the load device is no longer necessary or can no longer be achieved correctly.

20. A method of transporting electrical energy at a distance, the method comprising:

providing a generator device comprising a first pair of electrodes, a first electrode of the first pair of electrodes being an active electrode and a second electrode of the first pair of electrodes being a passive electrode which is not grounded, the first pair of electrodes being connected to the terminals of a generator of electric energy at high frequency and high voltage, the active electrode being segmented into a plurality of sub-electrodes, wherein one terminal of the generator is connected to each sub-electrode of said plurality of sub-electrodes via a respective switch, and the other terminal of the generator is connected, without an intervening switch, to the passive electrode, and the switches are arranged to selectively control which sub electrodes of the active electrode are connected to said one terminal of the generator;

providing at least one load device, the load device comprising a second pair of electrodes one being an active electrode and the other being a passive electrode, the second pair of electrodes being connected to a load;

positioning the active electrode of the at least one load device in the vicinity of a sub-set of the plurality of sub-electrodes of the generator device;

automatically detecting the sub-set of sub electrode in whose vicinity the active electrode of said at least one load device is positioned, and transporting electrical energy to said at least one load device by activating the switches to connect, to said one terminal of the generator, said sub-set of sub electrode detected in the detecting step, while the other sub-electrodes are not connected to the generator, creating a region of intense electric field localized in the vicinity of said at least one sub-electrode, the region being located in the vicinity of said at least one load device, capacitively coupling said sub-set of sub electroted detected in the detecting step to the active electrode of said at lease one load device, whereby said intense electric field region induces an electric charge in the active electrode of said at least one load device thereby transferring electrical energy to the load device.

* * * * *